Patented Nov. 21, 1939

2,180,932

UNITED STATES PATENT OFFICE 2,180,932

FLAVORING SOLUTION

Frits E. Stockelbach, Verona, N. J.

No Drawing. Application June 30, 1939,
Serial No. 282,074

8 Claims. (Cl. 99—140)

My present invention relates to flavoring and aroma-imparting substances adapted for use in comestibles, tobacco and the like, and aims to provide certain improvements therein.

Most flavoring and aroma-imparting substances are extracts, essential oils, or synthetic compounds possessing characteristic flavors and aromas. In the preparation of these substances ethyl alcohol has been the solvent most commonly used because it is water soluble, it dissolves essential oils and aromatic chemicals, it is a good menstruum for the extraction of vegetable matter such as vanilla beans and tonka beans, and also acts as a preservative for the resultant extract. Ethyl alcohol, however, has the drawback of having a low boiling point and a high vapor pressure, hence when alcohol extracts are used in baking or candy making at temperatures far exceeding the boiling point of alcohol the alcohol used as the menstruum and solvent in the extract volatilizes and carries off some of the flavor and aroma-imparting substance thus necessitating the use of considerably more extract than otherwise would be necessary if a solvent having a high boiling point were used.

The esters of glycerine, such as monoacetin and diacetin have been employed as solvents for flavoring extracts and although they are good solvents for most of the aromatic substances used in preparing flavoring extracts, these esters are susceptible to hydrolysis in the presence of water with the liberation of acetic acid which imparts a sour odor to the flavoring extracts and renders them useless for culinary purposes.

I have found that the ethyl ethers of glycerine and particularly the mono-ethyl-ether are valuable solvents in the preparation of flavoring extracts because they are perfectly stable, are miscible with water, they do not hydrolize, they have relatively high boiling points and therefore act as fixatives for the aromatic substances present in the extract, and they show exceptionally good solvent power toward the various essential oils and aromatic chemicals usually employed in the preparation of flavoring solutions. Said ethyl ethers of glycerine are likewise good menstruums when used undiluted or diluted with water for all kinds of vegetable substances such as vanilla beans, tonka beans, Phoenugreek seeds, roasted coffee, roots and herbs, all commonly used by flavoring extract manufacturers.

As to the practical application of my invention I give below several examples of the manner of use of ethyl glycerine in the manufacture of flavoring solutions:

Lemon flavor

| | Per cent |
|---|---|
| Lemon oil | 5 |
| Mono-ethyl-glycerine | 95 |

Orange flavor

| | Per cent |
|---|---|
| Sweet orange oil | 5 |
| Diethyl glycerine | 95 |

Imitation vanilla flavor

| | Ounces |
|---|---|
| Vanillin | 1½ |
| Coumarin | ¼ |
| Mono-ethyl-glycerine | 10 |
| Caramel | 1 |

Water to make up one gallon of solution.

Vanilla bean flavor

Mix 30 parts of mono-ethyl-glycerine with 70 parts of water and use this diluted solvent as a menstruum for the percolation of vanilla beans, following the method given in the U. S. P., 8th edition.

Imitation raspberry flavor

| | Parts |
|---|---|
| Mono-ethyl-glycerine | 96 |
| Orris concrete | ½ |
| Benzyl acetate | 2 |
| Vanillin | ⅛ |
| Rhodinol | ⅛ |
| Ionone | ¼ |
| Amyl butyrate | 2 |
| Ethyl pelargonate | 1½ |
| Ethyl benzoate | ½ |
| Amyl acetate | 4 |
| Raspberry juice | 40 |

Imitation banana flavor

| | Parts |
|---|---|
| Ethyl pelargonate | 2½ |
| Ethyl butyrate | 3¼ |
| Amyl butyrate | 11¼ |
| Ethyl acetate | 2¾ |
| Amyl acetate | 12 |
| Oil sweet orange | 3 |
| Oil lavender flowers | 1 |
| Amyl valerianate | ¼ |
| Diethyl glycerine | 91 |

In use, in the flavoring of comestibles or in the imparting of aromas to substances such as tobacco, the flavoring or aroma-imparting substance dissolved in ethyl glycerine may be added in desired amounts in any well known manner to the material to which the flavor or aroma is to be imparted.

The invention, it will be appreciated, is susceptible of general application wherever a flavoring substance or an aroma-imparting substance is to be employed, subject however, to the limitation that the particular flavor or aroma-bearing substance be either soluble in the ethyl glycerine or that some other solvent for the flavoring or aroma-bearing substance be miscible or soluble in ethyl glycerine. Where ethyl glycerine is referred to in the specification and in the claims it is to be understood that either mono, di or triethyl glycerine may be employed, depending upon which of these compounds possesses the most desirable solvent and fixative qualities necessary for the particular substance, the flavor or aroma of which is to be utilized.

What I claim is:

1. A flavoring means comprising an aromatic substance dissolved in ethyl glycerine.

2. A flavoring solution comprising an essential oil dissolved in ethyl glycerine.

3. A flavoring solution comprising an aromatic substance dissolved in mono-ethyl-glycerine.

4. A flavoring solution comprising an aromatic substance dissolved in diethyl glycerine.

5. A flavoring solution comprising a plurality of aromatic substances dissolved in ethyl glycerine.

6. A flavoring solution comprising a flavoring extract dissolved in ethyl glycerine.

7. The art of flavoring comestibles which comprises dissolving a flavor containing substance in ethyl glycerine and adding a limited quantity of such resulting solution to the comestible.

8. The art of imparting a desired aroma to material, which comprises adding a solution of ethyl glycerine containing the desired aroma-containing substance, to the material.

FRITS E. STOCKELBACH.